(12) United States Patent
Amplatz (10) Patent No.: US 8,910,613 B2
(45) Date of Patent: Dec. 16, 2014

(54) INTERNAL COMBUSTION ENGINE

(71) Applicant: Kurt Amplatz, St. Paul, MN (US)

(72) Inventor: Kurt Amplatz, St. Paul, MN (US)

( * ) Notice: Subject to any disclaimer, the term of this patent is extended or adjusted under 35 U.S.C. 154(b) by 0 days.

(21) Appl. No.: 14/212,878

(22) Filed: Mar. 14, 2014

(65) Prior Publication Data

US 2014/0261299 A1  Sep. 18, 2014

Related U.S. Application Data

(60) Provisional application No. 61/782,143, filed on Mar. 14, 2013.

(51) Int. Cl.
  *F02B 41/00* (2006.01)
  *F02B 75/02* (2006.01)
  *F02B 19/16* (2006.01)

(52) U.S. Cl.
  CPC ..................... *F02B 19/16* (2013.01)
  USPC ........ 123/292; 123/70 R; 123/25 R; 123/1 R; 60/620; 60/622

(58) Field of Classification Search
  CPC ................ F02B 2075/027; F02B 2075/025; F02B 41/06; F02B 41/08; F02B 41/02; F02B 3/06; F02B 33/22; F02G 1/02; Y02T 10/14
  USPC .......... 123/292, 70 R, 68, 58.8, 22, 204, 221, 123/228, 239, 73 AE, 73 AF, 71 R, 72; 60/39.6, 620
  See application file for complete search history.

(56) References Cited

U.S. PATENT DOCUMENTS

| 2,791,881 | A | * | 5/1957 | Denker | ........................... 60/619 |
| 4,159,699 | A | * | 7/1979 | McCrum | ...................... 123/58.8 |
| 4,159,700 | A | * | 7/1979 | McCrum | ...................... 123/58.8 |
| 4,619,228 | A | | 10/1986 | Liu | |
| 5,056,471 | A | * | 10/1991 | Van Husen | .................. 123/51 R |
| 5,072,589 | A | * | 12/1991 | Schmitz | .......................... 60/622 |

(Continued)

FOREIGN PATENT DOCUMENTS

JP  61-210231  9/1986

OTHER PUBLICATIONS http://www.ilmor.co.uk/concept_5-stoke_1.php; Ilmor Engineering, 5-Stroke Concept Engine, Jul. 2012 (2 pages).

(Continued)

*Primary Examiner* — Hai Huynh
*Assistant Examiner* — Gonzalo Laguarda
(74) *Attorney, Agent, or Firm* — Hamre, Schumann, Mueller & Larson, P.C.

(57) ABSTRACT

An internal combustion engine is described that includes an expansion cylinder adjacent to a first combustion cylinder (or power cylinder). Combustion gases from the first cylinder are directed to the expansion cylinder to act on the piston in the expansion cylinder. The expansion cylinder has a larger bore (i.e. larger diameter piston) and/or a longer stroke than the first cylinder. The longer stroke also results in a much larger crankshaft arm resulting in a significantly improved mechanical advantage (i.e. torque). In addition, the expansion cylinder includes a check valve that is designed to automatically open the expansion chamber to atmosphere if a negative pressure develops due to the varying amount of exhaust gases at different speeds. In one embodiment, two power cylinders can be connected to one expansion cylinder.

5 Claims, 6 Drawing Sheets

(56) References Cited

U.S. PATENT DOCUMENTS

| | | | |
|---|---|---|---|
| 6,202,416 B1* | 3/2001 | Gray, Jr. | 60/620 |
| 6,393,841 B1* | 5/2002 | Van Husen | 60/620 |
| 6,553,977 B2* | 4/2003 | Schmitz | 123/561 |
| 7,121,236 B2* | 10/2006 | Scuderi et al. | 123/70 R |
| 7,806,102 B2* | 10/2010 | Hu | 123/316 |
| 7,950,358 B2* | 5/2011 | Hu | 123/70 R |
| 7,975,485 B2* | 7/2011 | Zhao et al. | 60/712 |
| 8,082,892 B2* | 12/2011 | Zhao et al. | 123/25 P |
| 2004/0099887 A1* | 5/2004 | Hazelton | 257/232 |
| 2004/0123821 A1 | 7/2004 | Hu | |
| 2010/0012058 A1 | 1/2010 | Hu | |
| 2010/0012082 A1 | 1/2010 | Hu | |
| 2010/0018479 A1 | 1/2010 | Hu | |
| 2010/0018480 A1 | 1/2010 | Hu | |
| 2012/0192841 A1 | 8/2012 | Meldolesi et al. | |

OTHER PUBLICATIONS

Phillips et al.: "Scuderi Split Cycle Research Engine: Overview, Architecture and Operation"; SAE International, J. Fuels Lubr, vol. 4, Issue 1, Apr. 2011, pp. 450-466.

* cited by examiner

INTERNAL COMBUSTION ENGINE

FIELD

This disclosure relates to internal combustion engines, in particular an internal combustion engine with more complete expansion of the combustion gases.

BACKGROUND

An internal combustion engine operates at relatively low efficiency. One indicator of this is the relatively high temperature and pressure of exhaust gases at the output indicating a significant amount of energy from the combustion process is being lost.

One attempt at increasing the efficiency of an internal combustion engine is described in U.S. Pat. No. 6,553,977.

SUMMARY

An improved internal combustion engine is described that has improved thermodynamic efficiency. The engine includes a second expansion cylinder adjacent to a first cylinder (also referred to as a power cylinder) in which the combustion occurs. In addition to acting on the piston in the first cylinder, combustion gases from the first cylinder are directed to the expansion cylinder to act on the piston in the expansion cylinder. The expansion cylinder has a larger bore (i.e. larger diameter piston) and a longer stroke than the first cylinder. In addition, the expansion cylinder includes a check valve that is designed to automatically open to vent the expansion chamber if a negative pressure develops due to the varying amount of combustion gases at various speeds.

In one embodiment, the expansion cylinder and the first cylinder are in phase with each other (e.g. about 0 degrees). The phase angle between the first cylinder and the expansion cylinder can be any angle one finds suitable. The first cylinder is part of a standard modern internal combustion engine.

The engine can operate on any type of fuel used in combustion engines, including but not limited to gasoline or diesel fuel.

The output of the expansion cylinder can be connected to any energy conversion device. For example, the piston in the expansion cylinder can be connected to the same crankshaft as the first cylinder. Alternatively, the piston in the expansion cylinder can be connected to a separate crank shaft that in turn is used to drive a pump, an electrical generator, or any other energy conversion device.

With a four stroke engine, two power cylinders can be connected to one expansion cylinder.

DETAILED DESCRIPTION

As discussed further below, an engine is described where combustion/exhaust gas of a first cylinder (or power cylinder) is directed into an expansion cylinder that has a larger bore and a larger stroke. The engine is more thermodynamically efficient and has more complete expansion of the combustion gases than the first cylinder operating by itself.

Figure 1:
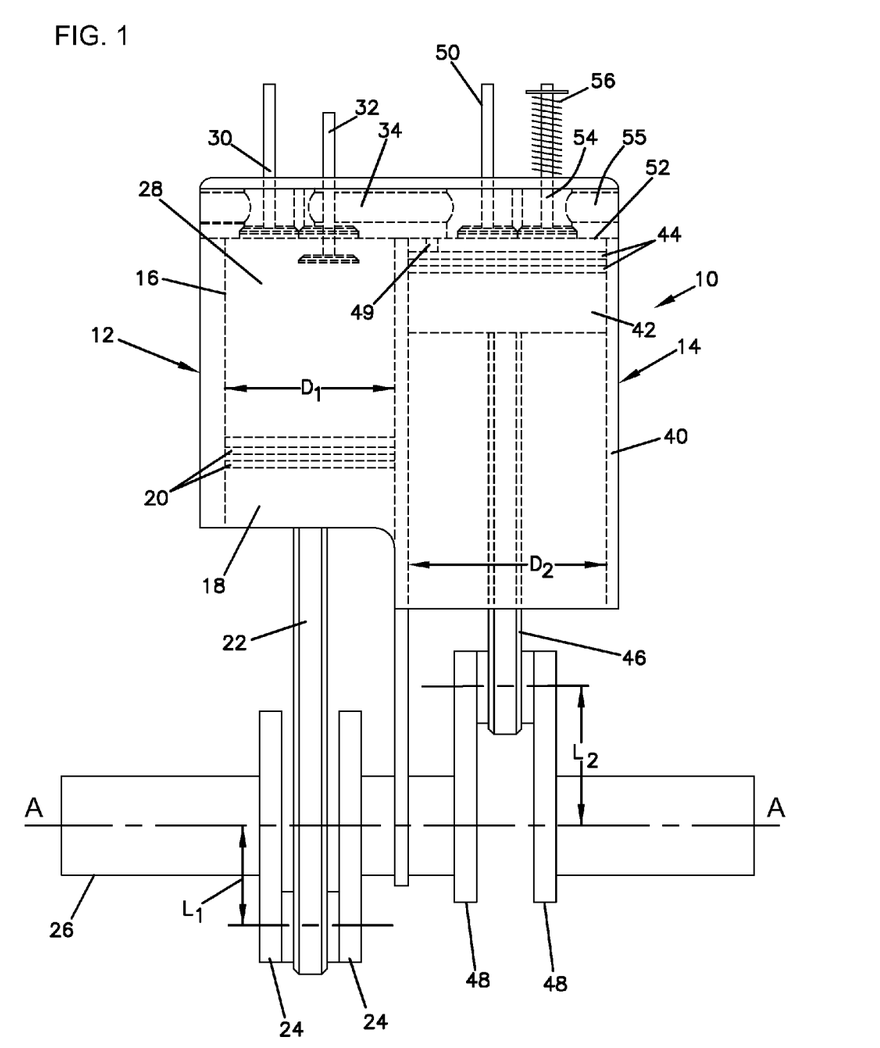
FIG. 1 is a side cross-sectional view of one embodiment of an internal combustion engine described herein.
Figure 2:
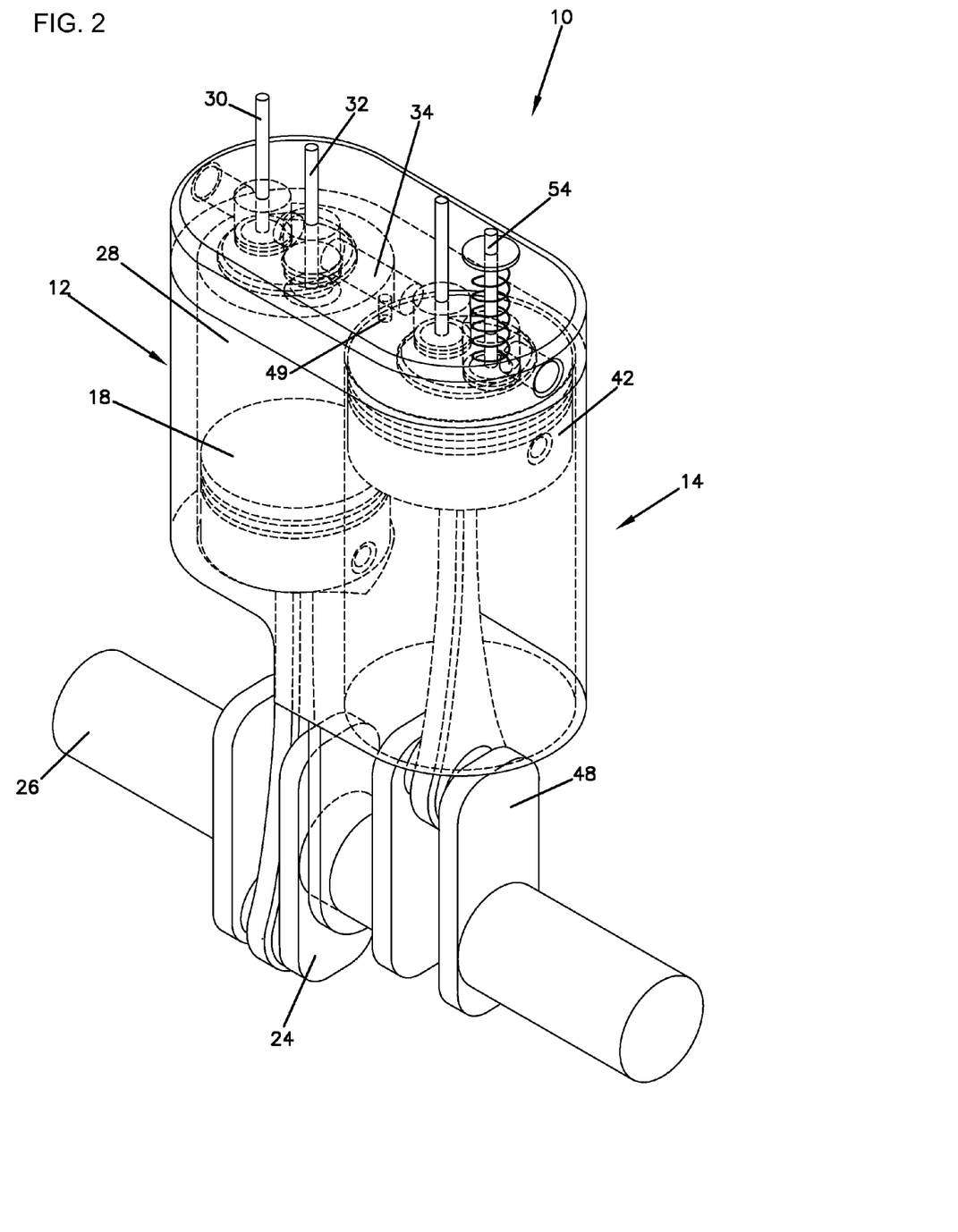
FIG. 2 is a perspective view of the engine of FIG. 1 with the cylinders illustrated as being transparent to permit viewing inside the cylinders.

With reference initially to FIGS. 1 and 2, a first embodiment of an internal combustion engine 10 includes a first cylinder 12 and an expansion cylinder 14. The first cylinder 12 includes a cylindrical bore 16 having a first diameter D1. A piston 18 is slidably disposed within the cylinder 12 and is sealed with the sidewall of the bore via conventional sealing rings 20. A piston shaft 22 is attached to and extends downwardly from the piston 18, with the end of the piston shaft 22 connected to one or more crank arms 24 fixed to a crank shaft 26 that is rotatable about an axis A-A. The crank arm(s) 24 has a length L1 as measured from the axis A-A.

As is conventional, the area of the cylinder 12 above the piston 18 defines a compression/combustion/expansion chamber 28. An air and fuel mixture is introduced into the chamber 28 via a conventional inlet valve 30. The cylinder 12 described so far is conventional in construction and operation.

The cylinder 12 also includes an exhaust valve 32 through which combustion/exhaust gases from the chamber 28 can be discharged to an exhaust passage 34. The exhaust passage 34 is fluidly connected to the expansion cylinder 14 to direct combustion/exhaust gas from the first cylinder 12 to the expansion cylinder 14.

The expansion cylinder 14 includes a cylindrical bore 40 having a second diameter D2 that is larger than the first diameter D1. A piston 42 is slidably disposed within the cylinder 14 and is sealed with the sidewall of the bore via conventional sealing rings 44. A piston shaft 46 is attached to and extends downwardly from the piston 42, with the end of the piston shaft 46 connected to one or more crank arms 48.

The crank arm(s) 48 has a length L2 as measured from the axis A-A which is larger than L1. As a result, the cylinder 14 has a stroke length (2×L2) that is larger than the stroke length (2×L1) of the cylinder 12.

In one embodiment illustrated in FIGS. 1-2, the cylinder 14 also includes an inlet passage 49 through which combustion/exhaust gases from the exhaust passage 34 are input into the cylinder 14. In this embodiment, the inlet passage 49 preferably does not include a valve. In another embodiment (not illustrated), the passage 34 can include a valve that controls the flow of the combustion/exhaust gases from the exhaust passage 34 into the cylinder 14.

The area of the cylinder 14 above the piston 42 defines an expansion chamber 52 into which combustion/exhaust gas from the passage 34 is input and acts on the piston 42. No compression or combustion occurs in the cylinder 14. Instead, combustion/exhaust gas from the combustion occurring in the cylinder 12, in addition to driving the piston 18, is used to drive the piston 42 in the expansion cylinder 14. Thus, there is more complete expansion of the combustion/exhaust gases from the combustion that occurs in the cylinder 12.

The stroke of the piston 42 can be converted into any suitable form of useful energy. For example, as shown in FIGS. 1 and 2, the crank arm(s) 48 is connected to the crank shaft 26. However, the crank arm(s) 48 can be connected to any device, separate from the crank shaft 26, to convert the reciprocating motion of the piston 42 into useful energy.

The cylinder 14 also includes an exhaust valve 50 that exhausts gases from the chamber 52 after driving the piston 42.

It has been found that a negative pressure can develop in the expansion chamber 52 during operation which can stall the engine 10. To prevent this from occurring, a check valve 54 is provided on the cylinder 14 in a vent passage 55 that places the expansion chamber in fluid communication with atmosphere. A coil spring 56 biases the valve 54 upwardly to a normally closed position. The check valve 54 operates to automatically open when a negative pressure develops in the expansion chamber 52 such that the exterior pressure is greater than the pressure in the expansion chamber which forces the check valve 54 open thereby equalizing the pressure in the expansion chamber 52 with atmosphere. Once the pressure equalizes, the check valve 54 automatically closes.

In the embodiment in FIGS. 1 and 2, the cylinder 12 is between about 180-190 degrees, for example about 190 degrees, out of phase with the cylinder 14. Therefore, when the piston 18 is approximately at bottom dead center, the piston 42 is approximately at top dead center. As the piston 18 nears or reaches bottom dead center, the valve 32 will open to allow combustion/exhaust gases to flow through the exhaust passage 34 and into the expansion chamber 52 of the cylinder 14 to act on the piston 42. At the end of the stroke of the piston 42, the exhaust valve 50 will open exhausting gas from the cylinder 14.

Figure 3:
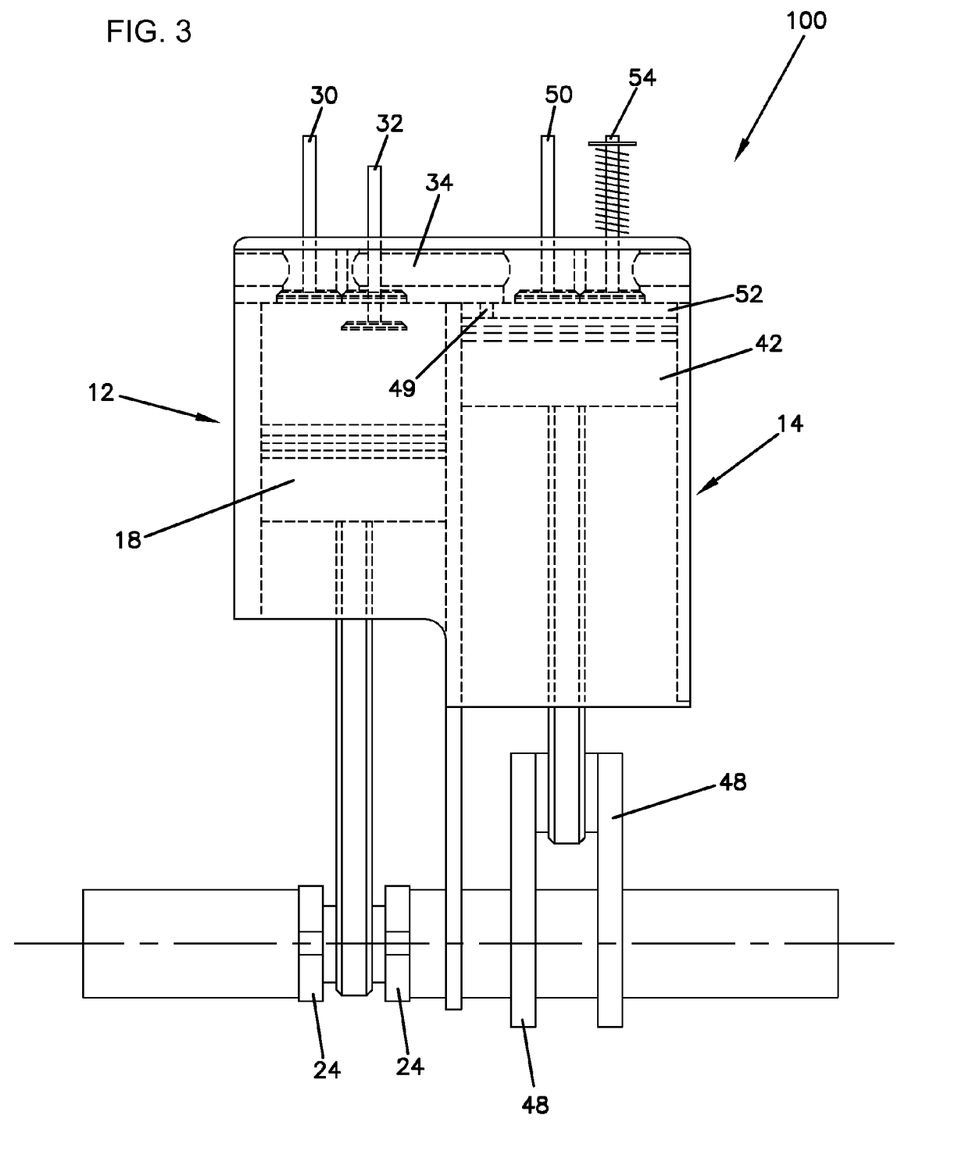
FIG. 3 is a side cross-sectional view of another embodiment of an internal combustion engine described herein.
Figure 4:
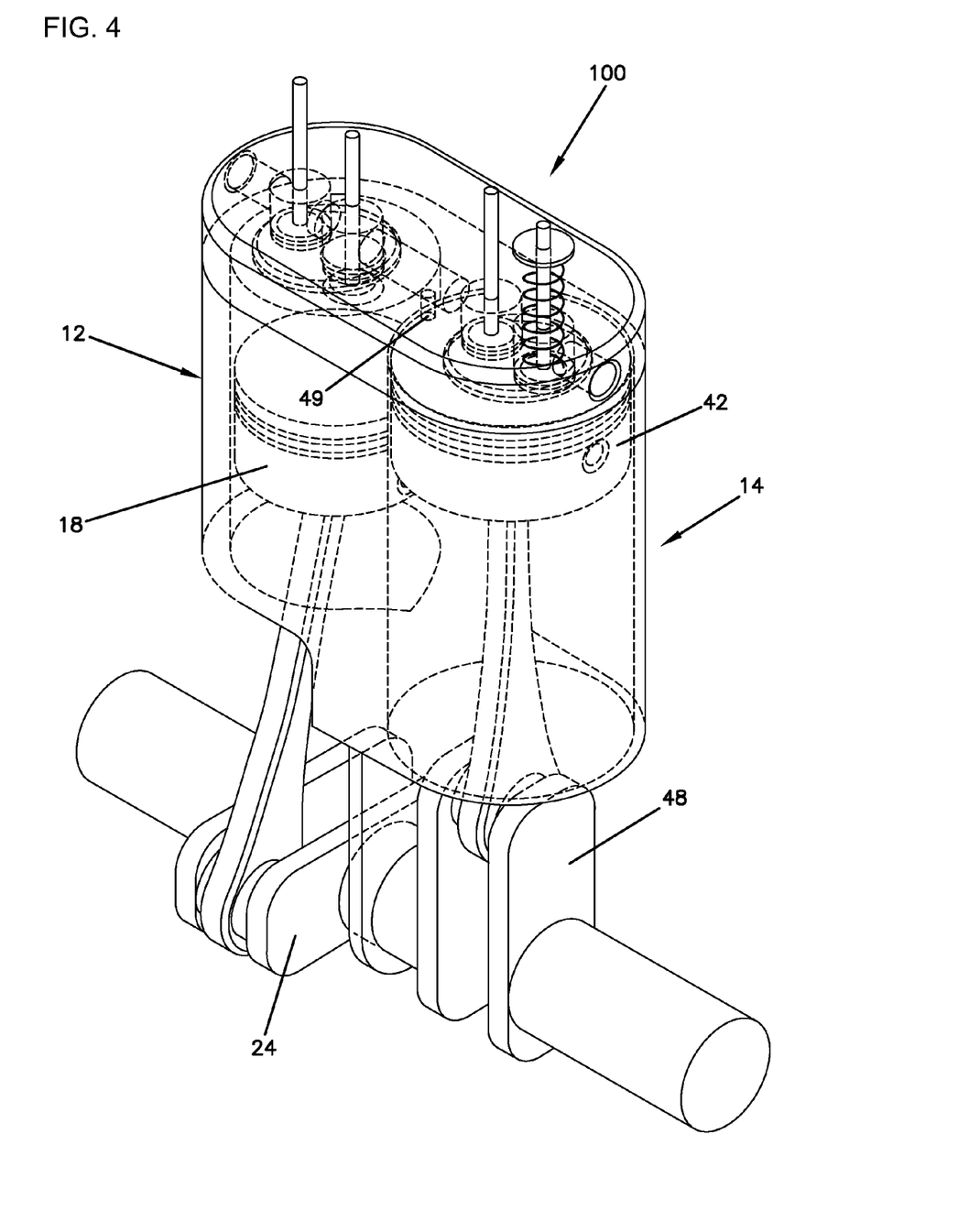
FIG. 4 is a perspective view of the engine of FIG. 3 with the cylinders illustrated as being transparent to permit viewing inside the cylinders.

FIGS. 3-4 illustrate an embodiment of an engine 100 that is identical to the engine 10, except that the cylinder 12 is approximately 90 degrees out of phase with the cylinder 14. Therefore, when the piston 18 is approximately halfway to bottom dead center, the piston 42 is approximately at top dead center. As the piston 18 nears or reaches half of its stroke, the valve 32 will open to allow the combustion/exhaust gases to flow through the exhaust passage 34 and into the expansion chamber 52 to act on the piston 42. At the end of the stroke of the piston 42, the exhaust valve 50 will open exhausting gas from the cylinder 14.

Figure 5:
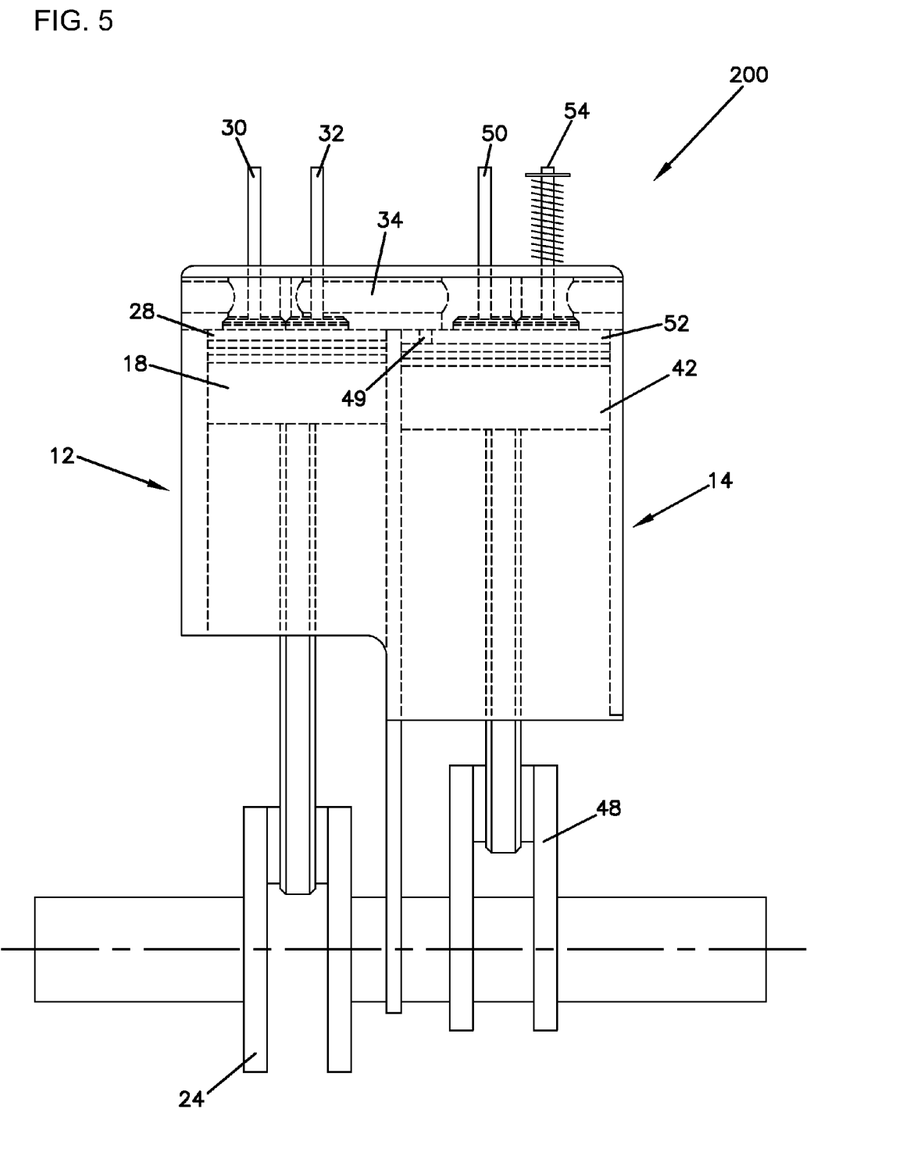
FIG. 5 is a side cross-sectional view of another embodiment of an internal combustion engine described herein.
Figure 6:
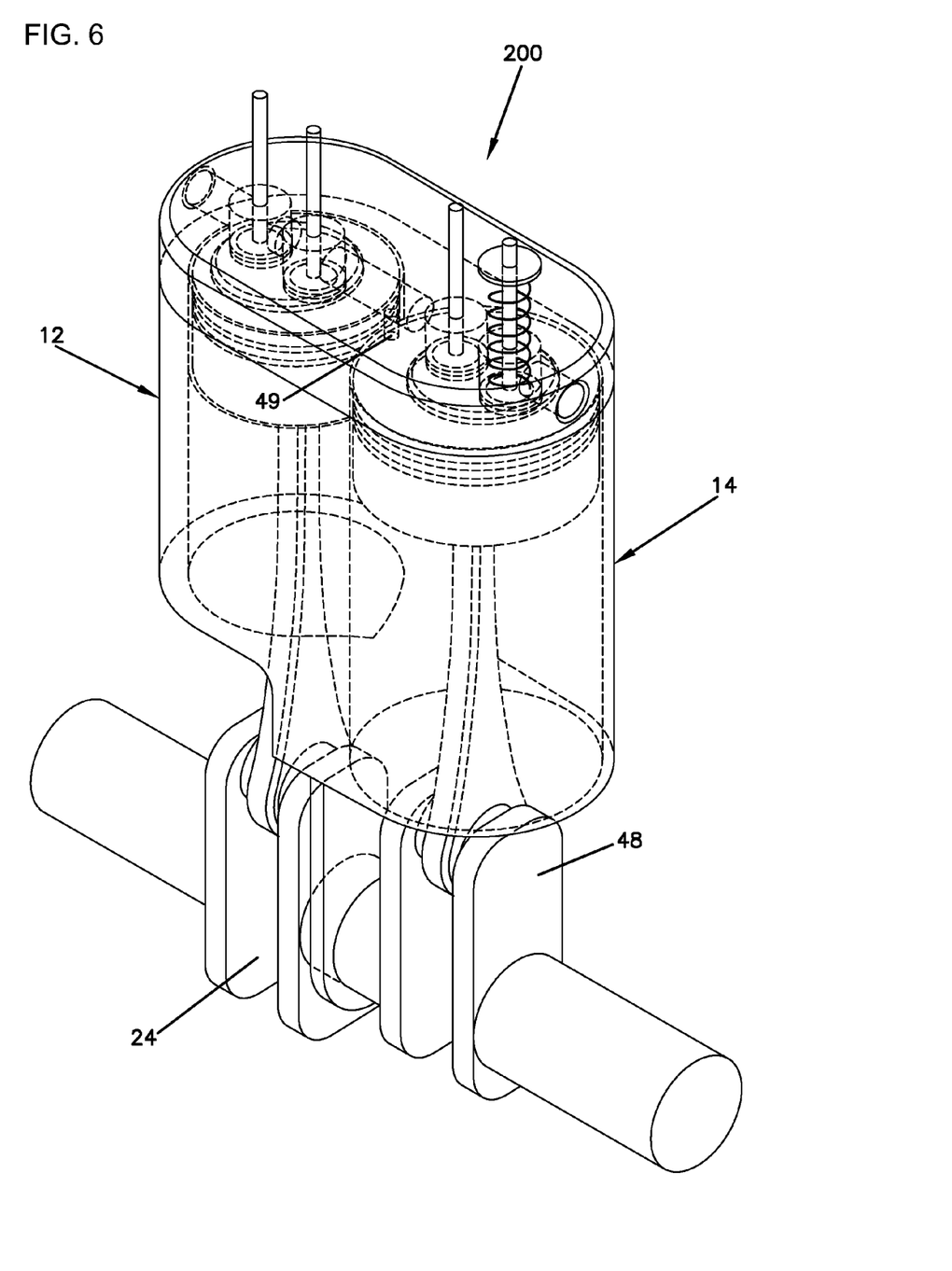
FIG. 6 is a perspective view of the engine of FIG. 5 with the cylinders illustrated as being transparent to permit viewing inside the cylinders.

FIGS. 5-6 illustrate an embodiment of an engine 200 that is identical to the engines 10 and 100, except that the cylinder 12 and the cylinder 14 are in phase with each other. Therefore, when the piston 18 is approximately at top dead center, the piston 42 is also approximately at top dead center. When combustion occurs in the chamber 28, the piston 18 is forced downward. At the same time, the valve 32 will open to allow the combustion/exhaust gases to flow through the exhaust passage 34 and into the expansion chamber 52 to act on the piston 42. At the end of the stroke of the piston 42, the exhaust valve 50 will open exhausting gas from the cylinder 14.

The phase angle between the first cylinder and the second cylinder can be any angle that one finds to be suitable.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. An internal combustion engine, comprising:
   a first cylinder with a first piston slidably disposed in the first cylinder, the first cylinder defining a combustion chamber having a first diameter;
   the first piston having a first stroke;
   an expansion cylinder adjacent to the first cylinder, with a second piston slidably disposed in the expansion cylinder, the expansion cylinder defining an expansion chamber having a second diameter;
   the first piston of the first cylinder is between about 180-190 degrees out of phase with the second piston of the expansion cylinder;
   an exhaust passage fluidly connecting the combustion chamber and the expansion chamber;
   one or more valves controlling the flow of gas from the combustion chamber to the expansion chamber through the exhaust passage;
   wherein the second diameter is larger than the first diameter and/or the second piston has a second stroke that is larger than the first stroke;
   a vent passage on the expansion cylinder that fluidly communicates the expansion chamber with atmosphere, and a check valve on the expansion cylinder that controls flow through the vent passage, the check valve is biased by a spring to a closed position preventing flow through the vent passage, the check valve is movable against the bias of the spring to an open position so that the expansion cylinder fluidly communicates with atmosphere, and a spring force provided by the spring is such that the check valve automatically opens if a negative pressure develops in the expansion chamber so that atmospheric pressure is greater than the negative pressure in the expansion chamber to equalize pressure in the expansion chamber with atmospheric pressure.

2. The internal combustion engine of claim 1, wherein the second diameter is larger than the first diameter, and the second stroke of the second piston is larger than the first stroke.

3. The internal combustion engine of claim 1, wherein the one or more valves comprise a valve on the first cylinder that controls the flow of gas from the combustion chamber into the exhaust passage, and there is no valve on the expansion cylinder that controls the flow of gas from the exhaust passage into the expansion chamber.

4. An internal combustion engine, comprising:
   a first cylinder with a first piston slidably disposed in the first cylinder, the first cylinder defining a combustion chamber having a first diameter;
   the first piston having a first stroke;
   an expansion cylinder adjacent to the first cylinder, with a second piston slidably disposed in the expansion cylinder, the expansion cylinder defining an expansion chamber having a second diameter larger than the first diameter;
   the second piston having a second stroke that is larger than the first stroke;
   an exhaust passage fluidly connecting the combustion chamber and the expansion chamber;
   one or more valves controlling the flow of gas from the combustion chamber to the expansion chamber through the exhaust passage;
   the first piston of the first cylinder is between about 180-190 degrees out of phase with the second piston of the expansion cylinder;
   an exhaust passageway at a top end of the expansion cylinder that is in fluid communication with the expansion chamber;
   an exhaust valve in the exhaust passageway controlling flow through the exhaust passageway;
   a vent passage at the top end of the expansion cylinder that fluidly communicates the expansion chamber with atmosphere, the vent passage is separate from the exhaust passageway;

a check valve in the vent passage that controls flow through the vent passage, the check valve is biased by a spring to a closed position preventing flow through the vent passage, the check valve is movable against the bias of the spring to an open position so that the expansion cylinder fluidly communicates with atmosphere, and a spring force provided by the spring is such that the check valve can automatically move to the open position when a pressure in the expansion chamber is less than atmospheric pressure.

5. The internal combustion engine of claim 4, wherein the one or more valves comprise a valve on the first cylinder that controls the flow of gas from the combustion chamber into the exhaust passage, and there is no valve on the expansion cylinder that controls the flow of gas from the exhaust passage into the expansion chamber.

* * * * *